United States Patent Office 2,800,364
Patented July 23, 1957

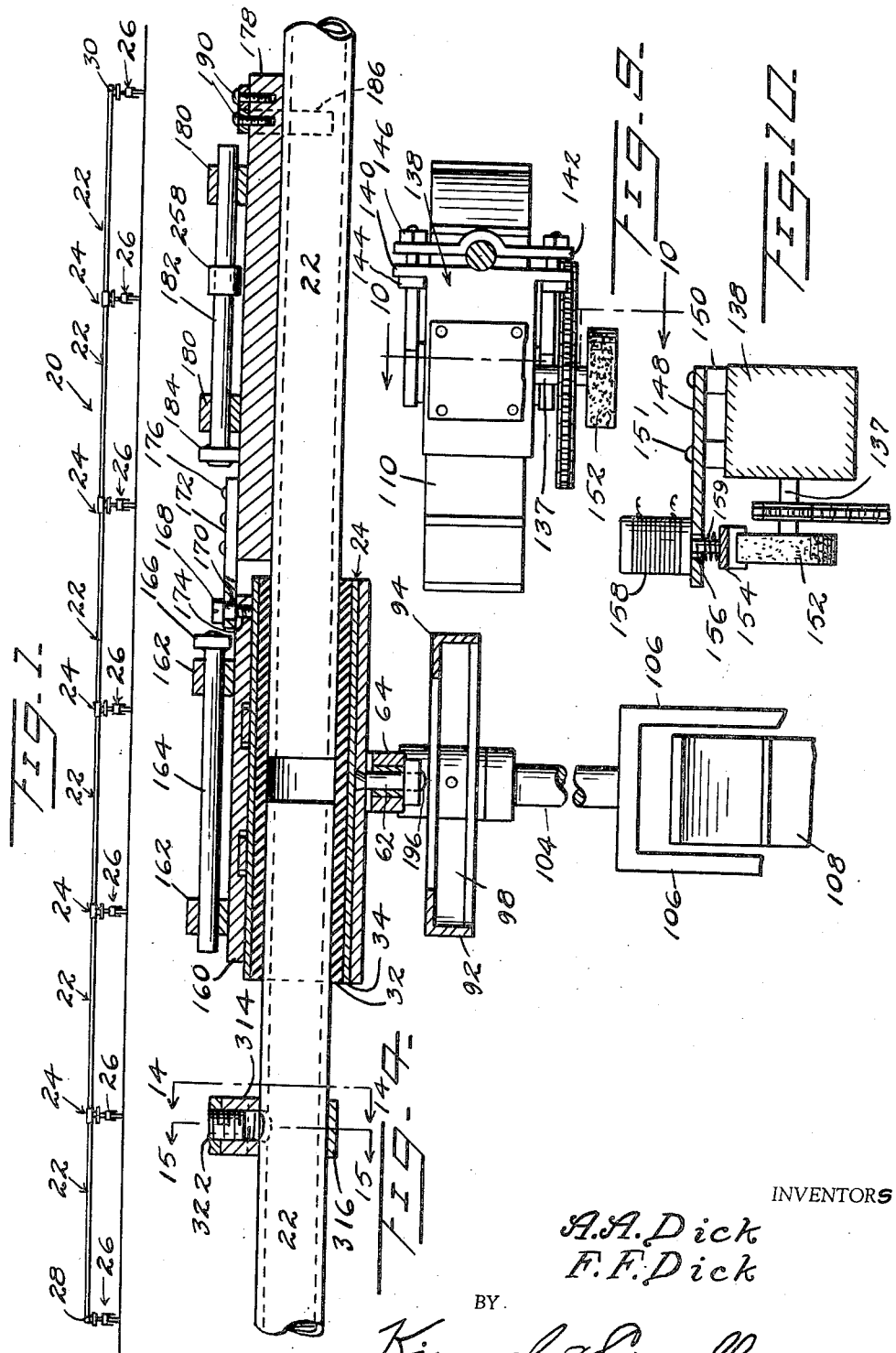

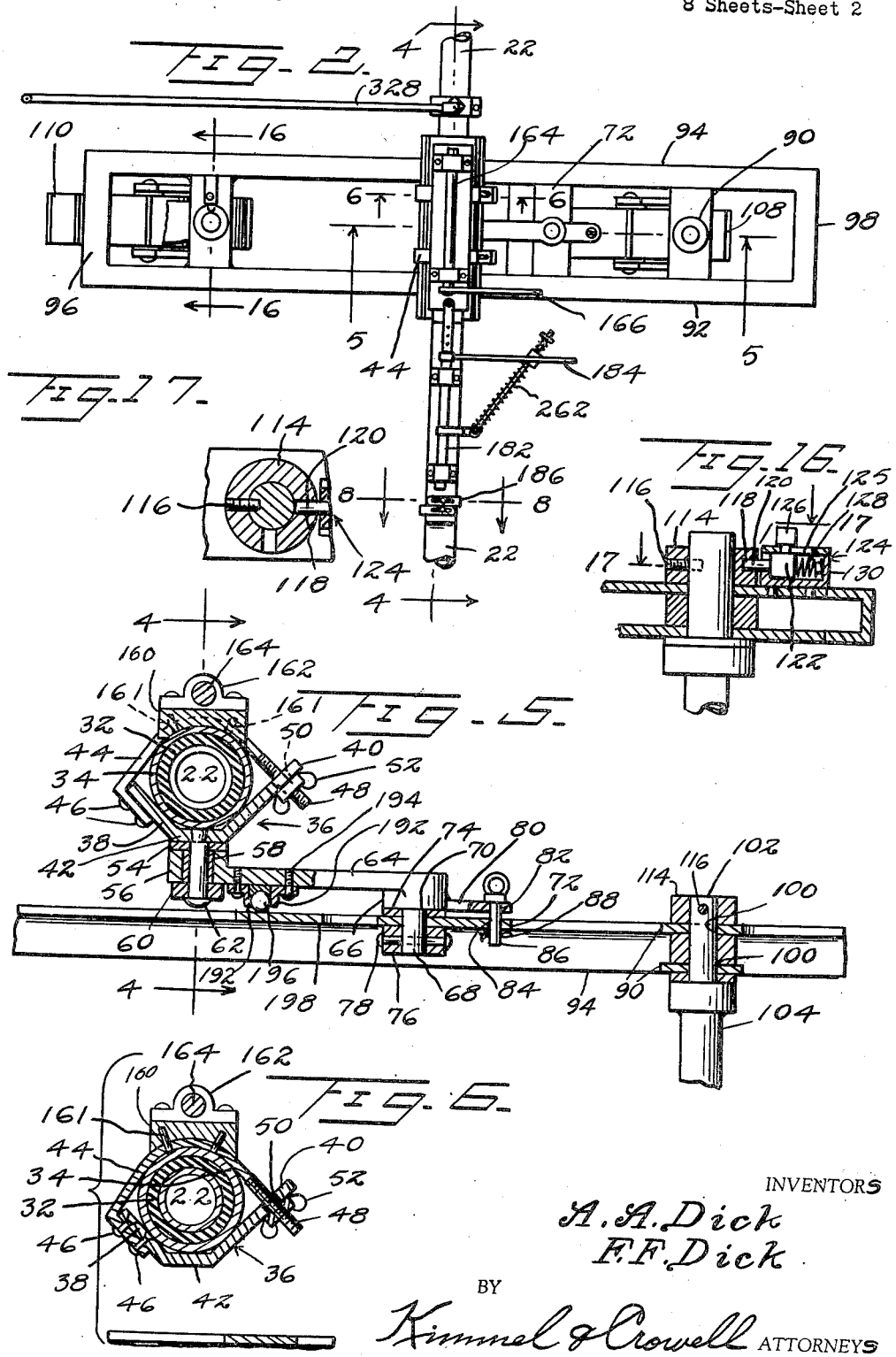

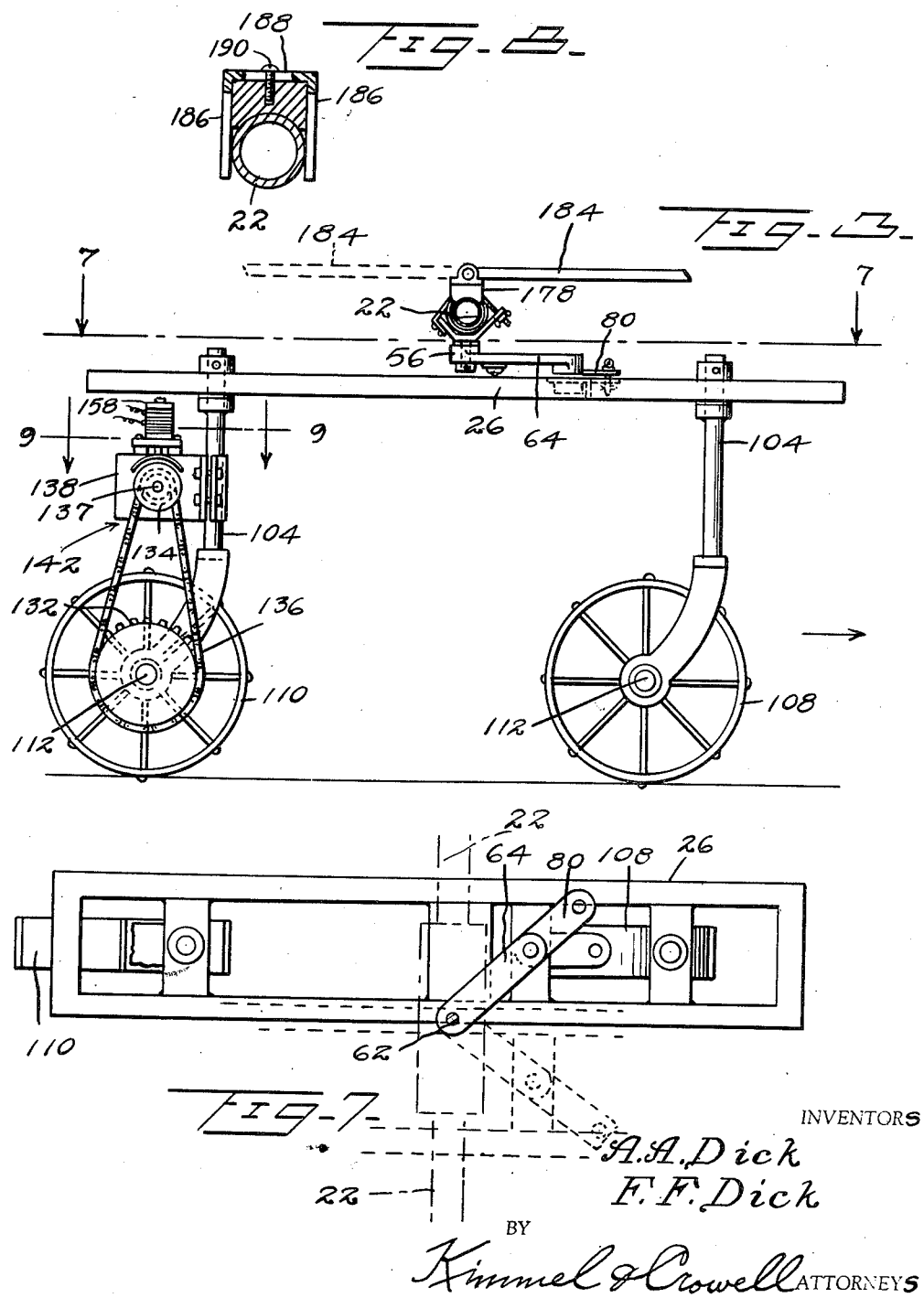

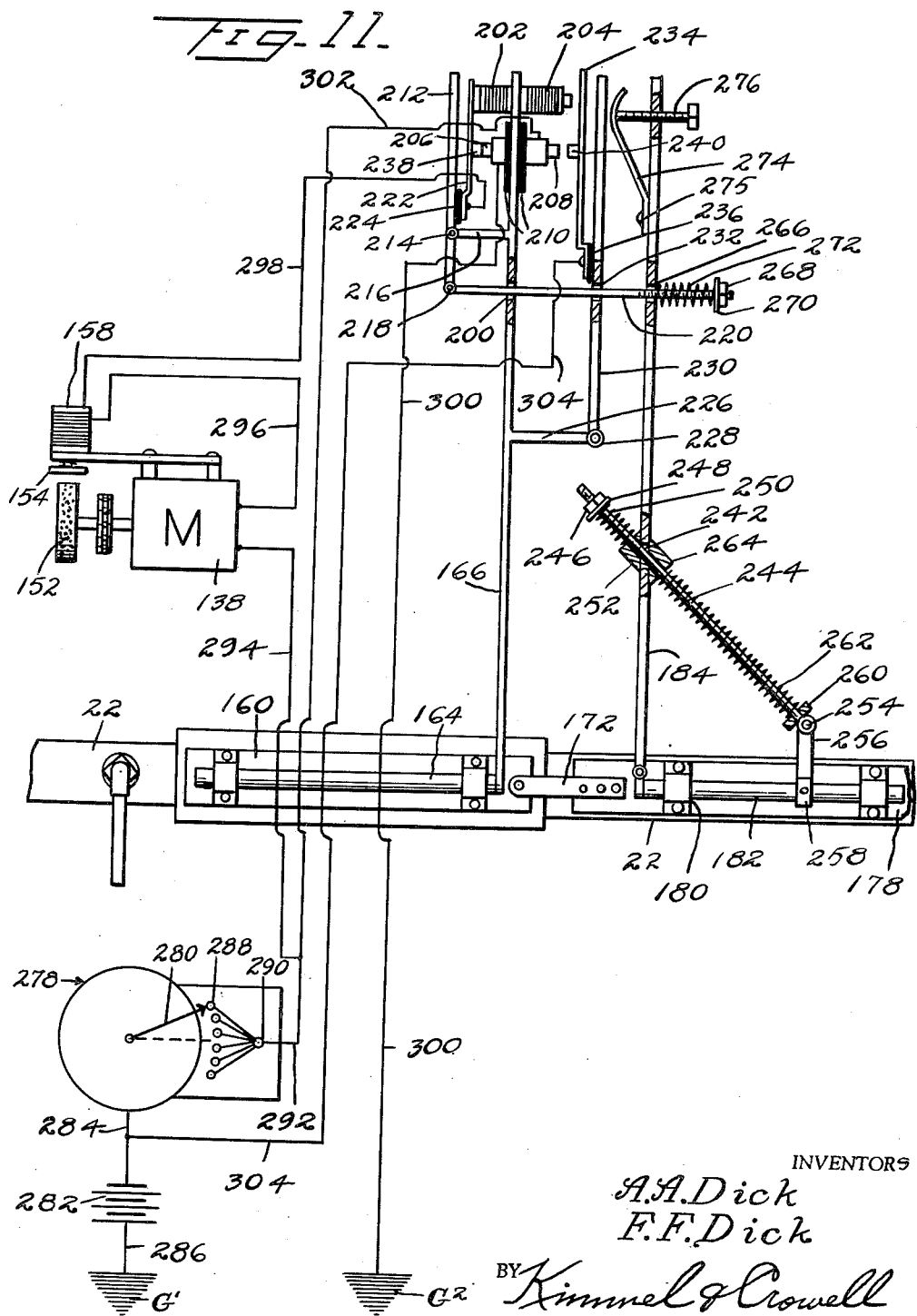

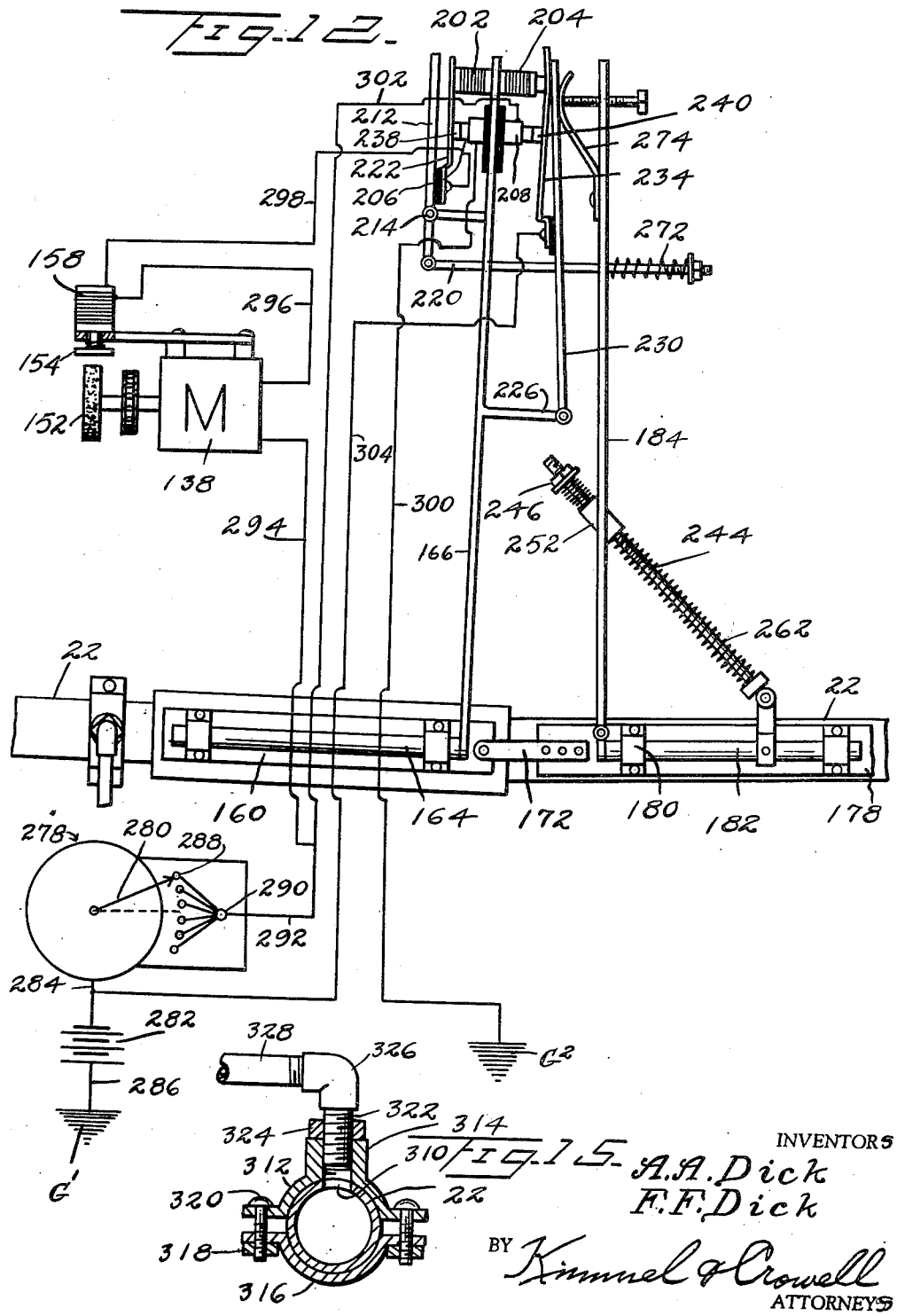

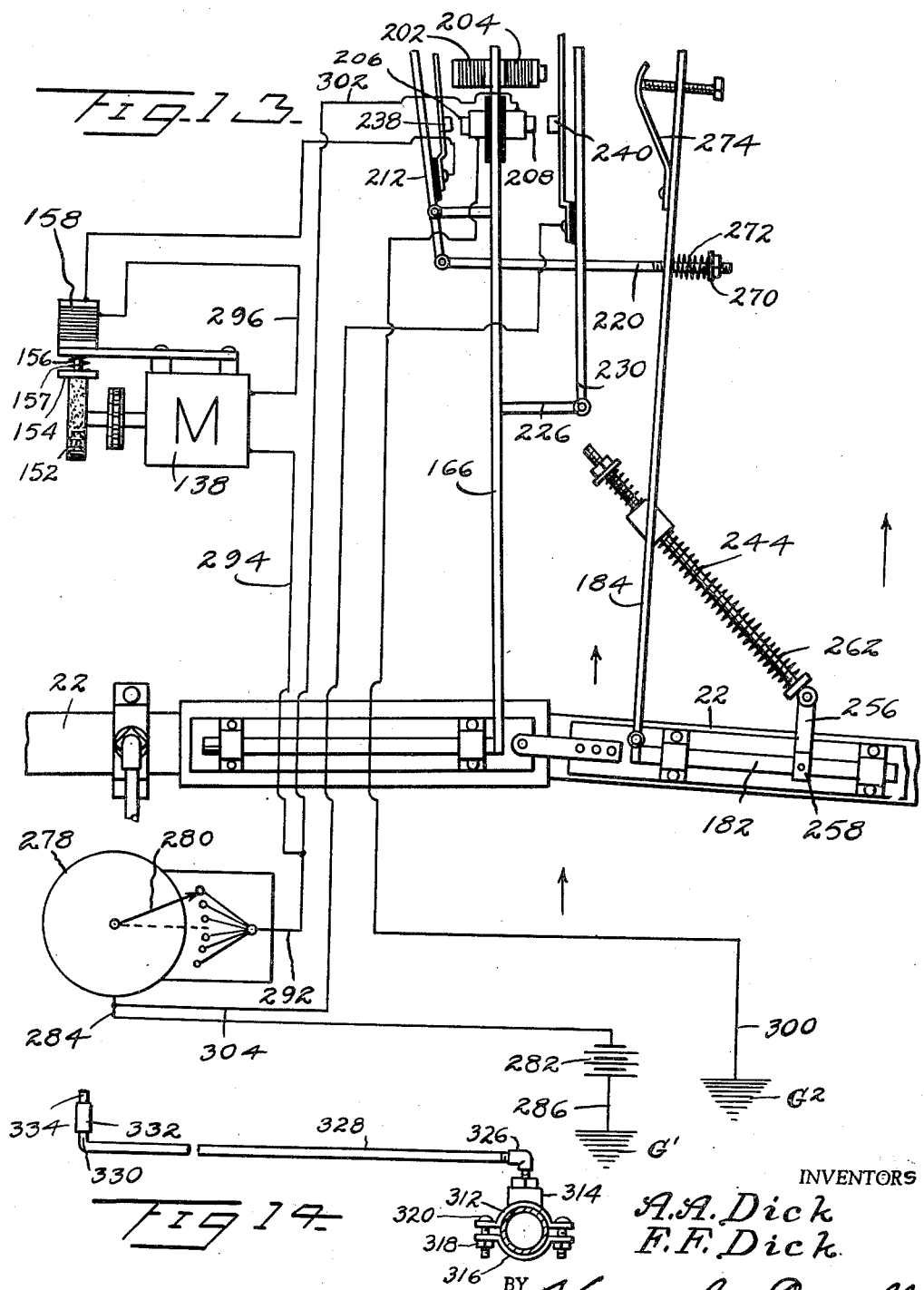

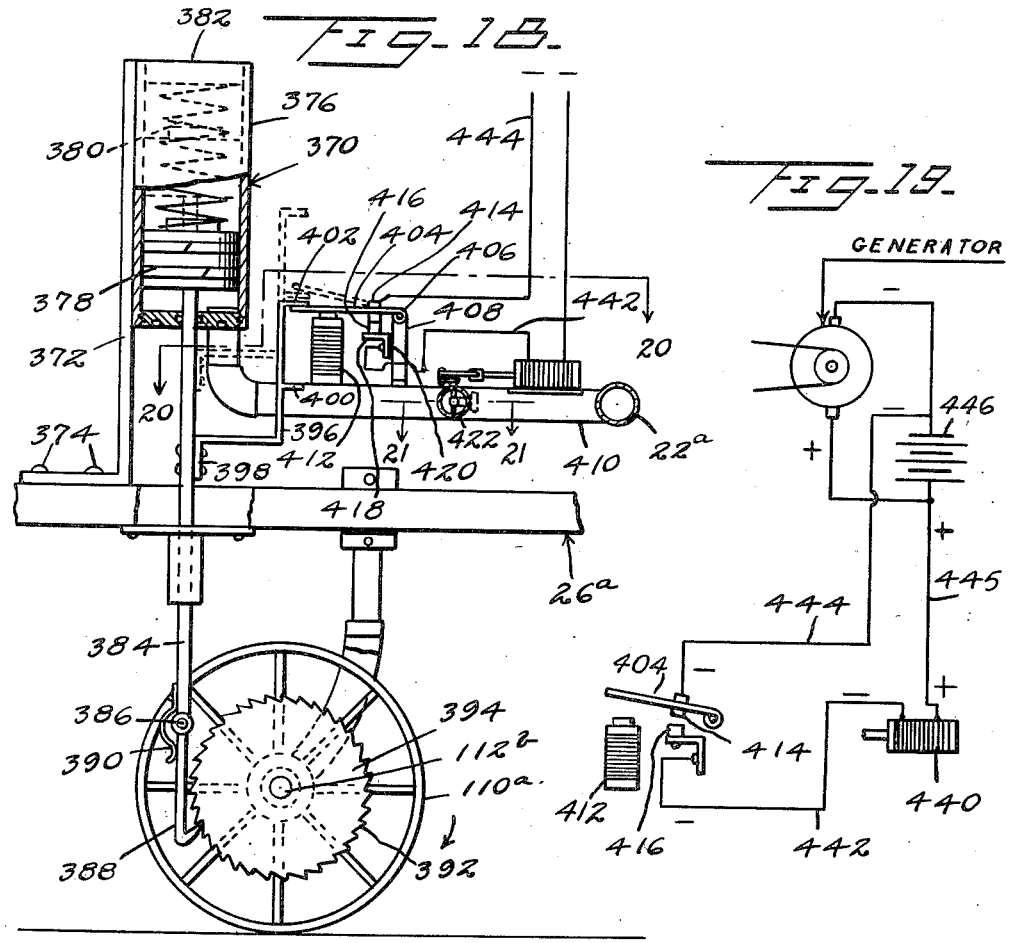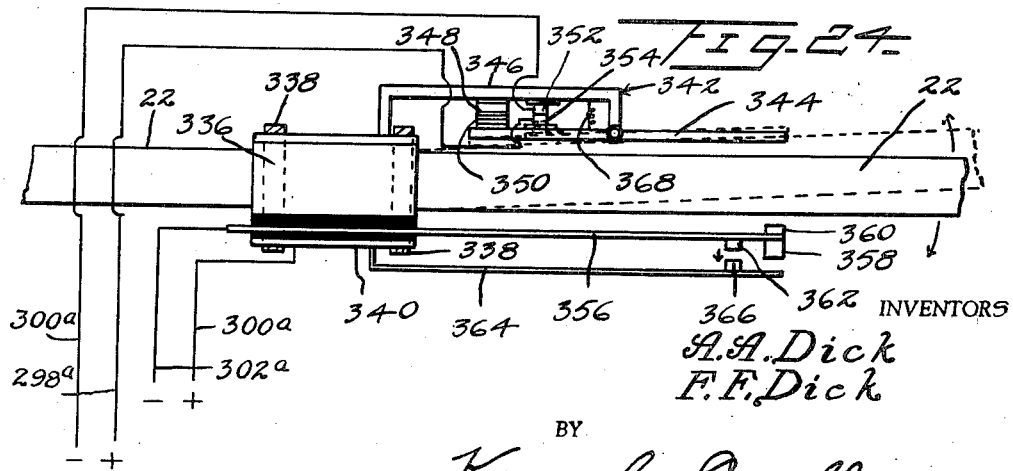

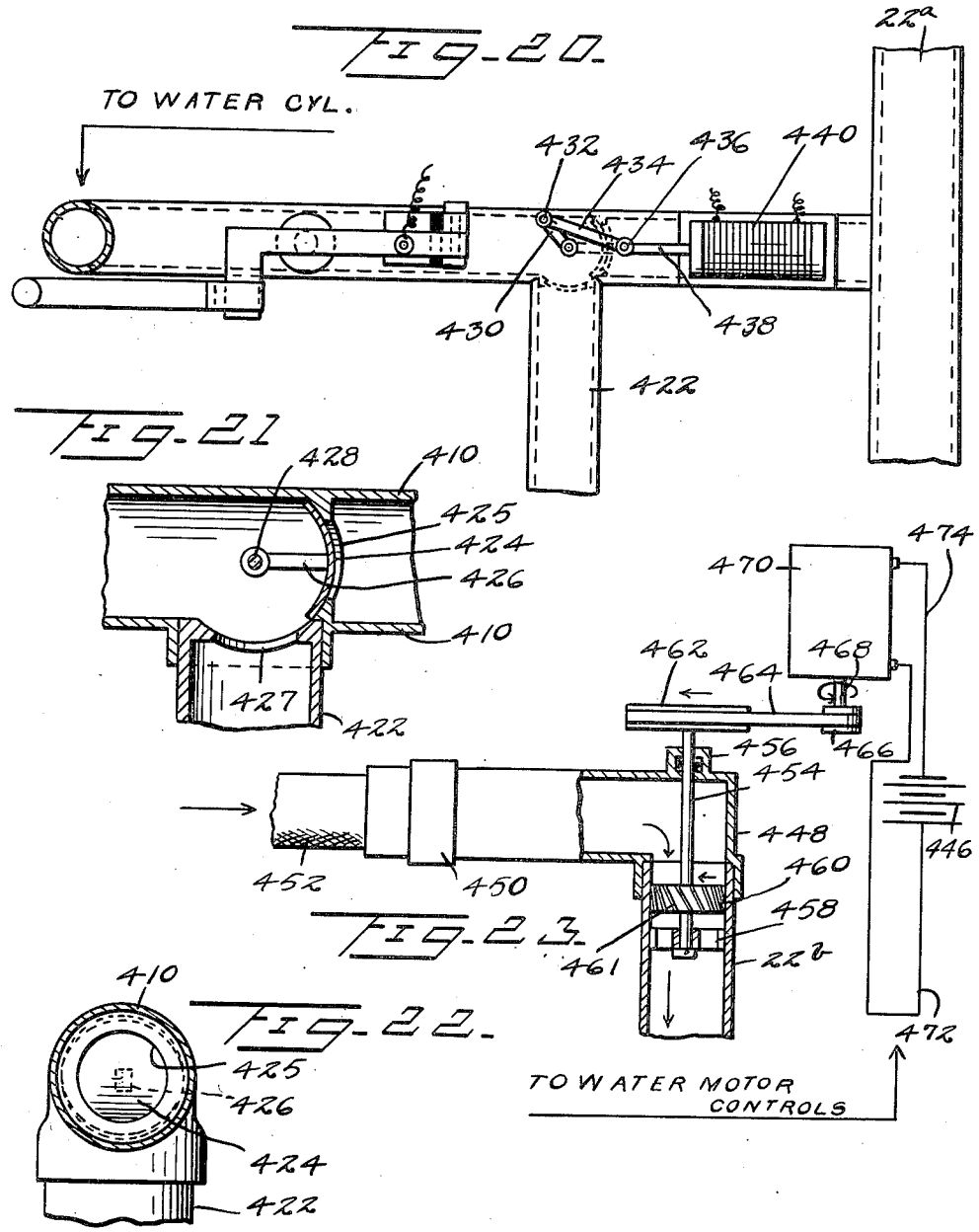

2,800,364

IRRIGATING APPARATUS, INCLUDING PIPE ALIGNMENT MEANS

August A. Dick, Wichita, Kans., and Frank F. Dick, Henderson, Nebr., assignors, by direct and mesne assignments, of three-fifths to Gustav Thieszen Application March 8, 1955, Serial No. 492,910

4 Claims. (Cl. 299—47)

This invention relates to agricultural apparatus, and more specifically to a machine for irrigating fields.

One of the primary objects of this invention is to provide a machine for irrigating fields and which includes a plurality of connected pipe sections with means for moving the sections as a unit through a field to be irrigated.

Another object of this invention is to provide in the above-mentioned unit means for automatically maintaining the sections in coaxial alignment.

A further object of this invention is to provide the unit supra with timing means for automatically advancing and halting the unit at periodic intervals as it moves across a field.

A still further object of this invention is to provide automatic means for halting the movement of a pipe section which advances beyond an adjacent pipe section; and to also provide automatic means for moving into alignment a pipe section which has lagged behind an adjacent section.

This invention also contemplates the provision of a plurality of wheeled vehicles for supporting the connected pipe as it advances down the field, the vehicles being provided with means for changing the direction of the travel of the unit to an angle of substantially 90° with respect to the normal path of movement thereof; and to also provide means for reversing the normal path of movement of the unit.

As a further object of this invention it is proposed to provide electric drive means for each of said vehicles, the electric drive means being controlled by the aforesaid automatic means.

A further object of this invention is to provide irrigating apparatus of the type described above, the apparatus being electrically driven and powered by a battery, the apparatus including a battery charging means.

Other and further objects and advantages of the present invention will become more evident from a consideration of the following specification when read in the light of the annexed drawings, in which:

Figure 1 is an end elevational view of an irrigating machine constructed in accordance with this invention.

Figure 2 is a fragmentary top plan view of a pair of coupled pipe sections mounted on one of the wheeled vehicles.

Figure 3 is a side elevational view of the vehicle shown in Figure 2.

Figure 4 is a longitudinal cross-sectional view taken on the vertical planes of lines 4—4 of Figures 2 and 5, respectively, looking in the direction of the arrows.

Figure 5 is an enlarged detail transverse cross-sectional view taken on the horizontal plane of line 5—5 of Figure 2, looking in the direction of the arrows.

Figure 6 is an enlarged detail transverse cross-sectional view taken on the horizontal plane of line 6—6 of Figure 2, looking in the direction of the arrows.

Figure 7 is a top plan view of the vehicle taken on the horizontal plane of line 7—7 of Figure 3, looking in the direction of the arrows.

Figure 8 is an enlarged detail transverse cross-sectional view taken on the horizontal plane of line 8—8 of Figure 2, looking in the direction of the arrows.

Figure 9 is an enlarged top plan view, partially broken away and partly in section, taken on the line 9—9 of Figure 3, looking in the direction of the arrows.

Figure 10 is an enlarged cross-sectional view, partly in elevation, taken on the line 10—10 of Figure 9.

Figure 11 is a top plan view of the automatically operated switches in their respective normal position, and a schematic illustration of their wiring circuits.

Figure 12 is a top plan view of the automatically controlled switches and wiring diagram therefor and illustrating the position of the switches when one pipe section has advanced relative to an adjacent section.

Figure 13 is a top plan view of the automatically controlled switches and wiring diagram therefor and illustrating the position of the switches when one of the sections has lagged behind an adjacent section.

Figure 14 is an enlarged detail transverse cross-sectional view taken on the vertical plane of line 14—14 of Figure 4, looking in the direction of the arrows.

Figure 15 is an enlarged detail cross-sectional view, partly in side elevation, taken on the vertical plane of line 15—15 of Figure 4, looking in the direction of the arrows.

Figure 16 is an enlarged detail transverse cross-sectional view taken on the line 16—16 of Figure 2, looking in the direction of the arrows.

Figure 17 is an enlarged detail cross-sectional view taken on the horizontal plane of line 17—17 of Figure 16, looking in the direction of the arrows.

Figure 18 is a side elevational view, partly in cross-section of a second embodiment of an irrigation device constructed in accordance with this invention.

Figure 19 is a schematic wiring diagram illustrating the controls for the apparatus illustrated in Figure 18.

Figure 20 is a top plan view, partly in section, taken on the line 20—20 of Figure 18, looking in the direction of the arrows.

Figure 21 is an enlarged detail cross-sectional view taken on the horizontal plane of line 21—21 of Figure 18, looking in the direction of the arrows.

Figure 22 is an enlarged detail cross-sectional view, partly in elevation, taken on the vertical plane of line 22—22 in Figure 21, looking in the direction of the arrows.

Figure 23 is a top plan view, partly in cross-section, illustrating a third embodiment of this invention.

Figure 24 is a top plan view of a pair of end conduits, together with control means for their respective vehicle, the control means being applicable to any pair of end conduits in apparatus described in accordance with any of the above embodiments.

Referring now more specifically to the drawings, reference numeral 20 designates, in general, irrigation apparatus constructed in accordance with the teachings of this invention. As is illustrated herein (see Figure 1) the apparatus comprises a plurality of elongated substantially hollow cylindrical conduits 22 normally positioned in coaxial alignment and having their respective adjacent ends connected by coupler means generally indicated at 24. The connected conduits 22 are mounted for movement as a unit across a field to be irrigated on wheeled vehicles to which has been ascribed the reference numeral 26. While not illustrated in the drawings, it is to be understood that one of the terminal ends 28 of the unit 20 is connected with a source of fluid (water) under pressure and the other terminal end thereof is provided with a suitable cap or closure member 30.

The coupling between adjacent ends of the conduits is illustrated in Figure 4 and is seen to comprise an elongated cylindrical gasket or sleeve 32 formed of rubber or other similar materials which surrounds the adjacent ends of the conduits 22 and which is, in turn, encased by a substantially hollow metallic cylindrical member 34.

Each coupling 24 is mounted (see Figures 5 and 6) in a substantially U-shaped saddle 36 and bears against the side walls 38, 40 and the bight portion 42. As is seen in the drawings, the side walls 38, 40 diverge upwardly from the bight 42.

One end of a pair of flexible straps 44 is fixedly secured, as by rivets 46, to the side wall 38, and the other ends thereof have secured thereto one end of a threaded shaft 48. The other ends of the shafts 48 are passed through suitable openings 50 formed in the side wall 40, and the slack in the straps 44 is taken up by the wing nuts 52 which are threaded on the shafts 48.

The bight portion 42 bears on a centrally apertured washer 54 which is positioned on the upper end of an enlarged substantially hollow boss 56 having a bearing sleeve 58 disposed therein. A second washer 60 is placed into juxtaposition relative to the lower end of the boss 56, and the washers 54 and 60, as well as the bight 42, are secured for rotation thereon by means of the elongated pivot pin 62.

The boss 56 is integrally formed at one end of a lever 64 which terminates at its other end in an enlarged cylindrical bearing boss 66 which projects laterally and downwardly therefrom and is provided with an integrally formed pivot pin 68 of reduced diameter. The pivot pin 68 is rotatably mounted in an aperture 70 formed in a cross-bar 72. A centrally apertured bearing washer 74 is interposed between the boss 66 and cross-bar 72, and a lock collar 76 is secured to the lower end thereof by means of a pin 78.

The boss 66 is provided with an integrally formed extension 80 having an aperture 82 formed therein which is adapted to register, in one position, with a second aperture 84 formed in the cross-bar 72. When in registry, the apertures 82 and 84 may receive under certain conditions a removable lock pin 86 held in position by a cotter pin 88.

The cross-bar 72 as well as pairs of vertically spaced and substantially parallel cross-braces 90 are fixedly secured to a pair of elongated laterally spaced and substantially parallel side frame members 92, 94 (see Figures 2, 4 and 5) connected at their respective adjacent ends by end frame elements 96, 98. Each pair of cross-braces 90 are provided with aligned openings 100 which receive therethrough for rotation therein the reduced upper ends 102 of the wheel shafts 104 which are bifurcated at their lower ends to provide a pair of spaced arms 106, between which are mounted for rotation front and rear wheels 108, 110, respectively, on axles 112.

The reduced upper ends 102 have collars 114 secured thereto by set screws 116, and each collar is provided with a pair of pockets 118 disposed at right angles with respect to each other to selectively receive one end of a pin 120. The other end of the pin 120 terminates in an enlarged cylinder 122 which is mounted for reciprocation within a housing 124. The housing 124 has an elongated longitudinally extending slot 125 formed therein which is adapted to receive therethrough one end of a lever 126 that has the other end thereof fixedly secured to the cylinder 122. A helicoidal spring 128 is interposed between the end wall 130 of the housing 124 and the adjacent end of the cylinder 122 to constantly bias the pin 120 for movement away from the housing 124.

The axle 112 of the rear wheel 110 has secured thereto a sprocket wheel 132 which is connected in driving relation with a gear 134 by a chain 136. The gear 134 is fixedly secured to a drive shaft 137 of an electric motor 138. The motor 138 (see Figures 9 and 10) is provided with a base flange 140 and is secured to the wheel shaft 104 of the rear wheel 110 by the base plate 142 which is clamped to the shaft by bolts 144 and nuts 146. A substantially rectangular support plate 148 is mounted on the motor 138 and is maintained in spaced relation relative thereto on spacer collars 150 by bolts 151.

The drive shaft 137 has a brake wheel 152 fixedly secured thereon for rotation therewith. A brake shoe 154 is mounted on one end of the armature 156 of a solenoid 158, and a helicoidal spring 159 mounted on and surrounding the armature 156 constantly tends to bias the brake shoe 154 for movement toward the wheel 152.

An arcuately-shaped member 160 is mounted on the sleeve 32 by pins 161 (see Figure 5), and has secured thereto a pair of longitudinally spaced hinge barrels 162 which are adapted to receive therethrough a hinge shaft 164. The shaft 164 is secured in the barrels 162 by any conventional means.

One end of an elongated substantially rectangular support arm 166 is fixedly secured to one end of the shaft 164 for rotation therewith. A bolt 168 extends through an opening 170 formed in a pivot link 172 and is threaded into an opening 174 formed in the member 160. The other end of the link 172 is bolted at 176, or otherwise connected, to one end of an arcuately-shaped element 178. The element 178 has fixedly secured thereto a pair of spaced hinge barrels 180 in which is pivotally mounted a hinge shaft 182. One end of the hinge shaft 182 is connected with one end of a second elongated substantially rectangular support arm 184.

A pair of oppositely disposed substantially L-shaped centering guides 186 (see Figures 4 and 8) having slots 188 formed therein are secured to the arcuate element 178 by the threaded bolts 190 in side-by-side relation. The slots, of course, afford adjustment whereby the centering guides may be adjusted to accommodate pipe of varying sizes.

The lever 64 has a housing 192 secured to the underside thereof by bolts 194. The housing 192 encases a bearing 196 which is adapted to ride on a transversely extending bearing plate 198, the ends of which are fixedly secured to the side frame members 92, 94.

Referring now more specifically to Figures 11, 12 and 13, inclusive, it is seen that the support arm 166 is provided with an aperture 200 intermediate the ends thereof and has secured to its outer end a pair of permanent magnets 202, 204 mounted on opposite sides of the arm. Immediately adjacent the magnets 202 and 204, a pair of switch contact members 206, 208 are fixedly secured to opposite sides of the support arm 166 and are insulated therefrom by dielectric plates 210.

A lever 212 is pivoted at 214 intermediate its ends on a bracket 216 which projects laterally from the support arm 166. As is seen in the drawings, the inner end of the lever 212 is pivotally connected at 218 to one end of an elongated rod 220 which extends through the opening 200.

A steel keeper bar 222 has one of its ends fixedly secured to the lever 212 and is insulated therefrom by means of the dielectric pad 224.

A bracket arm 226 projects laterally from the support arm 166 intermediate the ends thereof and is hingedly connected at 228 to one end of a lever 230. The lever 230 is provided with an opening 232 through which extends the rod 220.

A steel keeper 234 has one of its ends fixedly connected to the lever 230 and is insulated at that point by means of a dielectric pad 236.

Each of the keepers 222, 234 have affixed thereto switch contact points 238 and 240 which are adapted to engage the switch contacts 206, 208 under certain given conditions.

The support arm 184 is apertured at 242 to receive therethrough an elongated inclined rod 244. The rod 244 has a threaded outer end adapted to receive a lock nut 246 and washer 248, the latter bearing against one end of a helicoidal spring 250 which is mounted on and surrounds a portion of the rod 244. The other end of the spring 250 abuts against a collar 252 which is mounted on the rod 244 adjacent one side of the opening 242.

The other end of the rod is pivotally mounted at 254 on a lug 256 having an enlarged hollow boss 258 through which extends the hinge shaft 182. A thrust washer 260 is mounted on the rod 244 adjacent the pivoted end thereof and is engaged by one end of a helicoidal spring 262. The other end of the helicoidal spring 262 abuts against a collar 264 which is mounted on the rod 244 and is disposed adjacent the other side of the opening 242.

The rod 220 extends through an opening 266 formed in the support arm 184 and is threaded at its outer free end. A nut 268 is threaded on the rod 220 and engages against a washer 270, the latter being engaged by one end of a helicoidal spring 272. The other end of the spring 272 is adapted to engage against the support arm 184.

A curvilinear finger 274 has one of its ends fixedly secured at 275 adjacent the upper end of the support arm 184. An adjustment bolt 276 is threaded through the upper end of the support arm 184 and the inner end thereof is adapted to bear against the concave side of the finger 274.

The motor 138 of each of the wheeled vehicles 26 is controlled by an electric circuit which includes a timing switch 278 having the sweep arm 280 thereof connected with one side of a battery 282 by wire 284. The other side of the battery 282 is grounded by wire 286. The sweep arm 280 is adapted to engage a plurality of fixed switch contacts 288 which are connected to a common binding post 290. Wires 292 and 294 connect the binding post 290 with one side of the motor 138. The other side of the motor 138 is connected by wire 296 to one side of the solenoid 158, and the other side of the solenoid connects by wire 298 with a keeper bar 222. The fixed switch contact 206 is grounded by wire 300. Wire 302 connects the switch contact 208 with the wires 292 and 294, and wire 304 connects the keeper 234 with the battery.

Under normal operating conditions, the switching apparatus assumes the positions shown in Figure 11 of the drawings. As illustrated therein, the motor 138 and the solenoid 158 are energized through the circuit which reads from the ground $G_1$, wire 286, battery 282, wire 284, sweep arm 280, contact 288, binding post 290, wires 292 and 294, the motor 138, wire 296, solenoid 158, wire 298, keeper 222, switch contacts 238 and 206, and wire 300 to ground $G_2$.

Under these normal operating conditions, the energization of the solenoid 158 effects a retraction of the armature 156 against the tension of the helicoidal spring 157. This movement of the armature 156 withdraws the brake shoe 154 from engagement with the brake wheel 152 thereby permitting the motor 138 to drive the rear wheel 110.

Let it now be assumed that a pair of adjacent conduits 22 have moved during the traverse of the field to be irrigated to the positions shown in Figure 12 of the drawings. Under these conditions, the rod 244 pushes against the support arm 184 and pivots the same toward the support arm 166. The free end of the support arm 184 moves the finger 274 into engagement with the lever 230 which, in turn, moves the keeper 234 into the magnetic field of the permanent magnet 204 causing the keeper 234 to snap quickly into engagement therewith. This effects a closing of the switch contacts 208 and 240 which closes a circuit to the motor 138 which reads as follows:

From the ground $G_1$, wire 286, battery 282, wire 304, keeper 234, switch contacts 240 and 208, wires 302 and 294, motor 138, wire 296, solenoid 158, wire 298, keeper 222, switch contacts 238 and 206, and to the ground $G_2$ through wire 300. Thus it is seen that should the sweep arm 280 move to a position intermediate the contacts 288 thereby opening the normal operating circuit for the motor 138, the motor 138 will remain energized through this secondary circuit until the two conduits 22 have assumed their aligned position.

Figure 13 illustrates a third position of a pair of adjacent conduits 22. With the conduits in the inverted V-shaped configuration illustrated in Figure 13, the rod 244 draws against the support arm 184 causing the same to move in a clockwise direction. As this movement takes place, the support arm 184 compresses the helicoidal spring 272 against the washer 270 and effects a lateral movement, to the right as viewed in Figure 13, of the rod 220. Movement of the rod 220 causes a pivotal movement of the lever 212 in a counter-clockwise direction thereby opening the switch contacts 206 and 238.

It is now seen that both the primary and secondary circuits to the motor 138 are open and the motor becomes deenergized simultaneously with the deenergization of the solenoid 158. The deenergization of the solenoid 158 permits its armature 156 to descend under the influence of the helicoidal spring 157 and the latter forces the brake shoe 154 into engagement with the brake wheel 152. This stops the forward movement of the vehicle 26 until the adjacent conduits are again moved into alignment.

The conduits 22 are apertured at 310 and the apertured pipe is encircled by a semi-circular band 312 having an enlarged substantially hollow boss 314 aligned with the aperture 310. The band 312 is secured to the conduit 22 by means of the semi-circular clamp bracket 316 and the nuts and bolts 318 and 320, respectively.

One end of a pipe 322 is threaded into the hollow boss 314 and is locked therein by means of the lock nut 324. The other end of the pipe 322 is threaded into one end of elbow fitting 326 which has its other end threadedly connected with one end of a pipe 328 which extends substantially at right angles to the longitudinal axis of the conduits and rearwardly of the vehicle. The other end of the pipe 328 is bent upwardly at 330 and connects with a fitting 332 which is, in turn, connected with a vertically extending pipe 334 which terminates in a spray nozzle (not shown).

Thus it is seen that as the irrigation apparatus alternately starts and stops as it moves across the field to be irrigated, water is provided for that purpose from the nozzle referred to above.

The control means for the two vehicles adjacent each end of the irrigation apparatus 20 is somewhat different in construction than the control means for the vehicles disposed intermediate thereof.

Reference is now made to Figure 24 wherein it is seen that the flexible coupler 336 has secured thereto by straps 338 a substantially flexible sleeve 340. An inverted substantially U-shaped support bar 342 has one of its ends secured to the sleeve 340 while the bight portion projects in a direction substantially parallel to the longitudinal axes of the conduits 22. The other end of the U-shaped bar 342 is pivotally connected to an elongated rock lever 344 intermediate the ends thereof.

The bight portion 346 of the U-shaped member 342 has secured thereto a permanent magnet 348 which is disposed in confronting relation relative to a magnet 350 fixedly secured to the innermost end of the rock lever 344. The bight 346 also has fixedly secured thereto a fixed switch contact 352 which confronts a switch contact 354 mounted on the rock lever 344. The switch contacts 352, 354 are connected to the timing mechanism illustrated in Figures 11 to 13, inclusive, and the wires illustrated in Figure 24 finding counterparts or equivalents in Figures 11 and 13, inclusive, have been ascribed identical reference numerals to which has been added the lower case letter "a."

The sleeve 340 connects one end of an elongated lever 356 to the coupling 336 and the other end of the lever 356 carries a permanent magnet 358 and a bumper element 360. Adjacent the permanent magnet 358 a switch contact 362 is fixedly secured to the lever 356.

One end of an L-shaped member 364 is fixedly secured to the sleeve 340 and has mounted thereon a fixed switch contact 366 which is disposed in confronting relation relative to the switch contact 362. The switch contacts 362, 366 are connected in the control circuits shown in Figures 11 to 13, inclusive.

In operation, the above described equipment functions as follows:

Assuming that the conduit 22 appearing to the right in Figure 24 pivots downwardly in the direction of the lowermost arrow, the pipe 22 engages bumper 360 and forces the permanent magnet 358 in a direction toward its keeper 364. Under the influence of the magnet 358 the keeper snaps toward lever 356 and closes the contacts 362, 366. Now if the motor 138 of the vehicle 26 supporting these two end conduits 22 has its timing circuit open, that is, when the sweep arm 280 is disposed between a pair of adjacent fixed contacts 288 as is illustrated in dotted lines in Figures 11 to 13, inclusive, the motor 138 remains energized through the secondary circuits which includes the wires 298a and 300a.

If, however, the conduit 22 moves to the dotted line position shown in Figure 24, the conduit will engage against the outer end of the rock lever 344 and will open the contacts 352, 354 against the tension of the spring 368 and the force exerted by the permanent magnets 348 and 350. Both the primary and secondary circuits to the motor 138 under these conditions being open, the motor and its associated armature are both deenergized to cause the above described braking operation to take effect.

Figures 18, 19, 20, 21 and 22 pertain to an embodiment of this invention wherein the prime movers comprise a water motor designated, in general, by the reference numeral 370.

The water motor 370 is mounted on a bracket 372 having the lower end thereof fixedly secured by rivets 374, or bolts, to the frame of the vehicle 26a. The water motor 370 is seen to comprise an elongated substantially hollow cylindrical member 376 having a piston 378 mounted for reciprocation therein. A spring 380 is interposed between the upper end 382 of the cylindrical member 376 and the piston 378, the spring 380 constantly biasing the piston 378 for movement toward the lower end of the cylindrical member 376.

One end of an elongated piston rod 384 is secured to the lower side of the piston 378 and has pivotally connected at 386 the ratchet lever 388. A leaf spring 390 fixedly secured to the piston rod 384 extends across the pivotal connection and engages the ratchet lever 388 constantly biasing the free end thereof for movement into engagement with the ratchet teeth 392 of a ratchet wheel 394. The ratchet wheel 394 is fixedly secured to the shaft 112a which is in turn keyed with the rear wheel 110a.

A standard 396 has one of its ends 398 secured to the piston rod 384, and the other end thereof is bent laterally at substantially right angles to the longitudinal axis of the standard 396. A lug 400 projects laterally from the standard 396 in spaced substantially parallel relationship to the outwardly bent portion 402 thereof, the portion 402 and the lug 400 comprising operating levers for a keeper 404. The keeper 404 is pivotally mounted at 406 on a bracket 408 which is secured by any conventional means to a branch pipe 410 having one of its ends connecting with the conduit 22a.

A permanent magnet 412 is also mounted on the branch pipe 410 immediately in the path of the keeper 404. The keeper 404 is provided with a switch contact 414 which confronts a switch contact 416 fixedly mounted on an angle member 418, the latter being connected with the bracket 408 and insulated therefrom at 420.

The branch pipe 410 has its other end connected with the lower end of the cylindrical member 376 to supply water thereto under pressure from the conduit 22a. The pipe 410, intermediate the ends thereof, has connected thereto a drain pipe 422 (see Figures 20, 21 and 22) controlled by a curvilinear valve 424 in the full line position shown in Figure 21, the branch pipe 410 is cut off from water supplied by the conduit 22a and water from the motor 370 is drained through the pipe 410 and the drain pipe 422, the spring 380 acting on the piston 378 to effect the ejection of water from the cylindrical member 376.

The valve 424 is secured to one end of an actuating lever 426 which is pivotally mounted on a vertically extending pivot pin 428 which extends transversely of the branch pipe 410. The upper end of the pivot pin 428 is fixedly secured to one end of a link 430 which is pivotally connected at 432 to a second link 434 having the other end thereof pivotally connected at 436 with one end of an armature 438 actuated by a solenoid 440.

The armature 438 is adapted for reciprocation within the solenoid 440 whereby the valve 424 may be moved to close against its valve seat 425 to prevent the inflow of water from the conduit 22a to the motor 370 and to rotate the valve 90° whereby the same is seated in valve seat 427 sealing off the drain pipe 422 and supplying the motor 370 with water under pressure from the conduit 22a. The action of the armature 438 is controlled by the vertical movement of the standard 396. As water under pressure is admitted to the motor 370, the standard is elevated and engages against the free end of the keeper 404.

Referring now to Figure 19 of the drawings, the upward movement of the keeper 404 breaks the engagement of the contacts 414 and 416. The solenoid 440 being connected in series through wires 442, 444 and 445 with the battery 446 and the switch contacts 414 and 416 is now deenergized and its armature moves outwardly causing the valve 424 to seat against its seat 425 in the full line position shown in Figure 21.

The motor 370 is thus free to drain. As water drains from the motor 370, the piston 378 descends, and in so moving, the portion 402 of the standard 396 engages against the free end of the keeper 404 which, under the influence of the permanent magnet 412, snaps the contacts 414, 416 into engagement with each other thereby reestablishing the circuit to the solenoid 440. The solenoid 440 now being energized, rotates the valve 424 90° causing the same to move into its valve seat 427, thereby establishing connection between the motor 370 and the conduit 22a through the branch pipe 410.

Referring now to Figures 19 and 23, a further modification of this invention is disclosed. At the water inlet end of a conduit 22b, an elbow connector 448 is shown as having one of its ends connected thereto. A suitable coupling 450 connects the other end of the connector with the discharge end of a flexible hose 452.

To provide means for maintaining a constant charge on the battery 446, a shaft 454 is rotatably journalled in bearings 456, 458 and has fixedly secured thereto a turbine wheel 460 disposed in the conduit 22b. The shaft 454 has one of its ends projecting beyond the fitting 448 to which is fixedly connected an enlarged pulley wheel 462. An endless belt 464 connects the pulley 462 with a second pulley 466 which is fixedly secured to the drive shaft 468 of a generator 470. The generator has its output end connected through wires 472 and 474 connected across the battery 446. Thus as water is supplied to the conduit 22b, the force thereof will act against the turbine blades 461 causing the turbine 460 to rotate. This, in turn, effects rotation of the pulleys 462 and 466 which drive the generator 470.

Referring now to Figures 3, 4, 5, 7 and 8, the pivotal connection of the saddle 36 with the framework of the vehicle permits the vehicle to move laterally with respect to the saddle in order that the same may follow a furrow extending through the field. This shifting movement of the vehicle 26 relative to the saddle 36 is illustrated in dotted lines in Figure 7.

Having described and illustrated several embodiments

What is claimed is:

1. Irrigation apparatus comprising a plurality of coaxially disposed substantially hollow tubular conduits, flexible coupling means connecting adjacent ends of each pair of conduits, a support arm pivotally mounted on said coupling means and having a pair of open and closed switches mounted thereon, means supporting said connected conduits for movement through a field, electric motor means connected with and driving said last-named means, a primary electrical circuit connected with said electric motor means and including a timer switch therefor, a secondary circuit including said open switch for energizing said motor means when said timer switch is open, and means for opening both of said switches to effect braking of said motor means.

2. Irrigation apparatus comprising a plurality of coaxially disposed substantially hollow tubular conduits, coupling means connecting the ends of each adjacent pair of conduits, means for supplying water to said conduits, each of said conduits having a discharge nozzle connected thereto, a wheeled vehicle frame supporting said conduits at each coupling, a saddle pivotally mounted on said wheeled vehicle frame for receiving each of said coupling means, an elecrtic motor having a driving connection with one of the wheels of said vehicle, a primary electric circuit for energizing said motor and including timer switch therefor, an elongated support arm pivotally connected on said coupling means, said support arm having a normally open and a normally closed electric switch mounted thereon, means for closing said open switch to close a secondary circuit to said motor to maintain said motor energized when said timer switch is open, and means for opening both of said switches to effect deenergization of braking means for said motor.

3. Irrigation apparatus as defined in claim 2, and means for releasably locking the wheels of said vehicle for movement in one direction, and means releasably locking said wheels for movement in a direction substantially perpendicular to said one direction.

4. Irrigation apparatus as defined in claim 2, and control means for said motor means connected with the coupling means connecting two end conduits, said control means comprising a normally closed switch and a normally open switch, said normally open switch being closed to establish a secondary circuit to said motor to maintain the wheeled vehicles and said end sections energized when said timer switch is open, and means for opening both of said switches to effect a braking of said motor.

References Cited in the file of this patent

UNITED STATES PATENTS

| | | |
|---|---|---|
| 1,966,783 | Balaam | July 17, 1934 |
| 2,604,359 | Zybach | July 22, 1952 |
| 2,628,863 | Maggart | Feb. 17, 1953 |
| 2,726,895 | Behlen | Dec. 13, 1955 |